(12) United States Patent
Lu

(10) Patent No.: US 11,836,307 B2
(45) Date of Patent: Dec. 5, 2023

(54) MOUSE PAD WITH 3D DECORATIVE OBJECT

(71) Applicant: HADES-GAMING CORP., New Taipei (TW)

(72) Inventor: Yu-Shan Lu, New Taipei (TW)

(73) Assignee: HADES-GAMING CORP., New Taipei (TW)

( * ) Notice: Subject to any disclaimer, the term of this patent is extended or adjusted under 35 U.S.C. 154(b) by 9 days.

(21) Appl. No.: 17/968,698

(22) Filed: Oct. 18, 2022

(65) Prior Publication Data

US 2023/0117079 A1    Apr. 20, 2023

Related U.S. Application Data

(60) Provisional application No. 63/257,482, filed on Oct. 19, 2021.

(51) Int. Cl.
*G06F 3/039* (2013.01)
*G06F 3/03* (2006.01)
*G06K 7/10* (2006.01)
*G06F 3/0354* (2013.01)

(52) U.S. Cl.
CPC .......... *G06F 3/0395* (2013.01); *G06F 3/0321* (2013.01); *G06F 3/03543* (2013.01); *G06K 7/10297* (2013.01); *G06K 7/10366* (2013.01)

(58) Field of Classification Search
CPC .. G06F 3/0395; G06F 3/0321; G06F 3/03543; G06K 7/10297; G06K 7/10366
See application file for complete search history.

(56) References Cited

U.S. PATENT DOCUMENTS

| | | | |
|---|---|---|---|
| 2014/0263908 A1* | 9/2014 | Franklin | F16B 1/00 248/309.4 |
| 2019/0113669 A1* | 4/2019 | Hong | G06F 3/039 |
| 2021/0215482 A1* | 7/2021 | Fonk | G01C 9/06 |

* cited by examiner

*Primary Examiner* — Robert J Michaud
(74) *Attorney, Agent, or Firm* — Maschoff Brennan

(57) ABSTRACT

A mouse pad includes a mat part having a fixation portion and a 3D decorative object removably fixed on the fixation portion.

11 Claims, 4 Drawing Sheets

MOUSE PAD WITH 3D DECORATIVE OBJECT

CROSS-REFERENCE TO RELATED APPLICATIONS

This application claims the priority benefits of U.S. provisional application Ser. No. 63/257,482, filed on Oct. 19, 2021. The entirety of each of the above-mentioned patent application is hereby incorporated by reference herein.

TECHNICAL FIELD

The disclosure relates to a mouse pad, more particularly relates to a mouse pad with a 3D decorative object.

BACKGROUND

Mouse pad is a pad with surface used to enhance the movement of a computer mouse. To make it more competitive, some print various drawings or patterns or add light-emitting elements on the mouse pad. However, conventional mouse pads in the market still are generally a flat pad and therefore are unable to satisfy requirements in some aspects, such as decoration, stylishness, visually appealing, and interaction with peripheral devices or user.

SUMMARY

One embodiment of the disclosure provides a mouse pad including a mat part having a fixation portion and a 3D decorative object removably fixed on the fixation portion.

According to the mouse pad as discussed in the above embodiments of the disclosure, the mat part has a fixation portion for the placement of a 3D decorative object, which makes the mouse pad look more three-dimensional, decorative, and visually appealing and create various connection to peripheral devices. For example, the 3D decorative object may have an appearance of a logo stand, an electronic photo frame, a regular photo frame, or a game character or be able to emit light to enhance or build aesthetic elements for the mouse pad or enhance or create the connection with peripheral elements or the user.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities. The phrase "in fluid communication with" or "in communication with" may be used to mean that fluid (liquid and/or gas) is allowed to flow between two spaces, areas, slots, holes, channels and/or openings.

Figure 1:
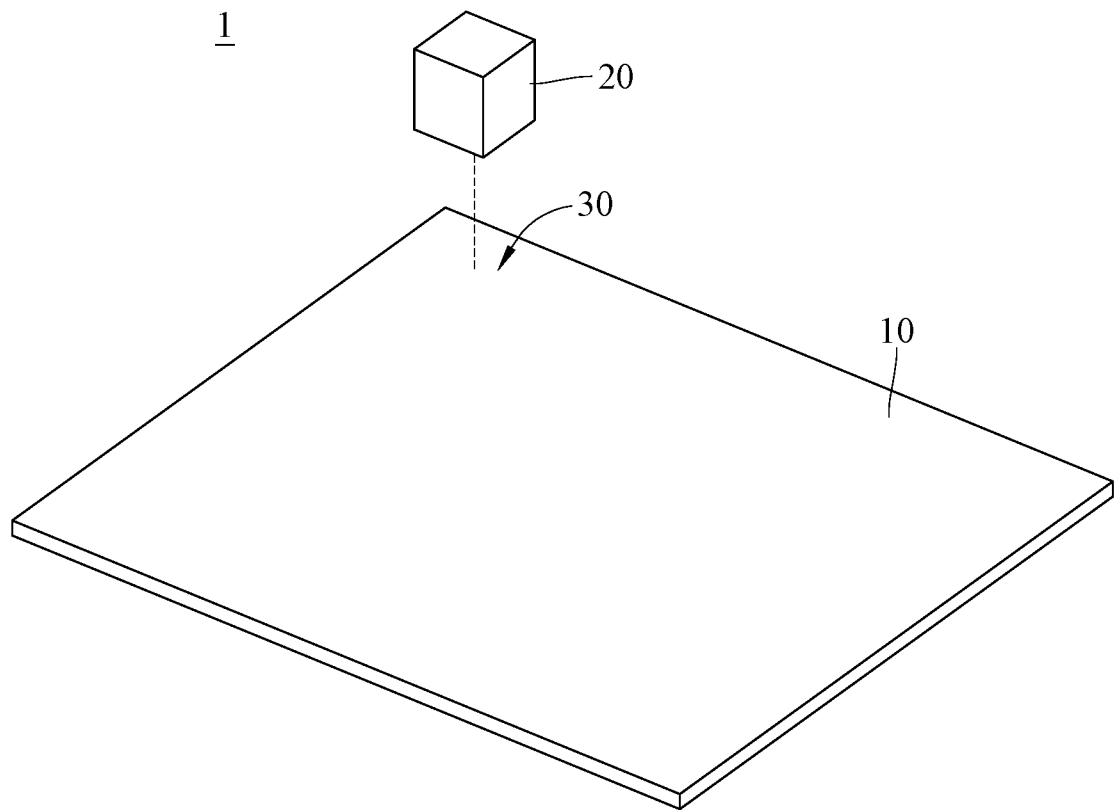
FIG. 1 is a schematic view of a mouse pad with a 3D decorative object of the disclosure.

Firstly, referring to FIG. 1, one embodiment of the disclosure provides a mouse pad 1, the mouse pad 1 may include a mat part 10, the mat part 10 may be in any suitable shape and size and may be made of any suitable material capable of providing a surface for moving a mouse, such as Mylar, silicone, polyester, rubber, paper, or glass. The mat part 10 may be a single layer or a stack of multiple layers.

Also, as shown, there may be a fixation portion 30 disposed on the mat part 10, the fixation portion 30 is able to support at least one three-dimensional (3D) decorative object 20. The 3D decorative object 20 means an object which is shaped or sized to be generally more three-dimensional than the mat part 10, thus the 3D decorative object 20 can make the mouse pad 1 more three-dimensional, decorative, and visually appealing. In some embodiments, the 3D decorative object 20 may be served as a doll, a sculpture, a statue, a molded work, a logo stand, an electronic photo frame, a regular photo frame, or a figurine which is suitable to be placed on the fixation portion 30 to enhance or build aesthetic elements for the mouse pad 1 or enhance or build the connection with peripheral elements. Note that any means capable of properly holding the 3D decorative object 20 at a predetermined area of the mat part 10 can be employed as the fixation portion 30.

Figure 2:
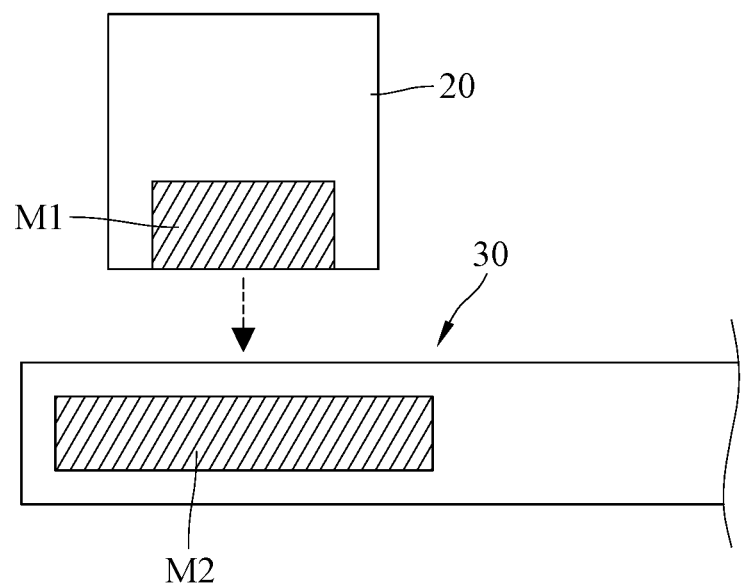
FIG. 2 is a partially enlarged cross-sectional exploded view of a mouse pad according to one embodiment of the disclosure.

For example, please refer to FIG. 2, which shows an exemplary embodiment of the mouse pad 1. As shown, the mouse pad 1 may include a first magnetic material M1 and a second magnetic material M2, one of the first magnetic material M1 and the second magnetic material M2 may be arranged at or embedded in the 3D decorative object 20 (e.g., the bottom of the 3D decorative object 20), and the other may be arranged at or embedded in the fixation portion 30. In one embodiment, the first magnetic material M1 and the second magnetic material M2 are magnets of opposite magnetic poles, so that the first magnetic material M1 and the second magnetic material M2 are magnetically attracted to each other. Alternatively, in other embodiments, one of the first magnetic material M1 and the second magnetic material M2 may be a magnet, and the other may be an electromagnet whose magnetic field is produced by electric current. In specific, when the second magnetic material M2 in the fixation portion 30 of the mouse pad 1 is an electromagnet and the first magnetic material M1 in the 3D decorative object 20 is a regular magnet, there may be a wire (not shown) embedded within the mat part 10 for providing electric current for the second magnetic material M2 to produce magnetic field attracting the first magnetic material M1.

In such an arrangement, when the 3D decorative object 20 approaches the fixation portion 30, the magnetic attraction force created between the first magnetic material M1 and the second magnetic material M2 secures the 3D decorative object 20 on the predetermined area of the fixation portion 30.

It is noted that the connection between the 3D decorative object 20 and the fixation portion 30 may not be magnetic force driven. In some other embodiments, the 3D decorative object 20 and the fixation portion 30 may have mating contours or any suitable latching mechanism for them to be engaged with each other.

Figure 3:
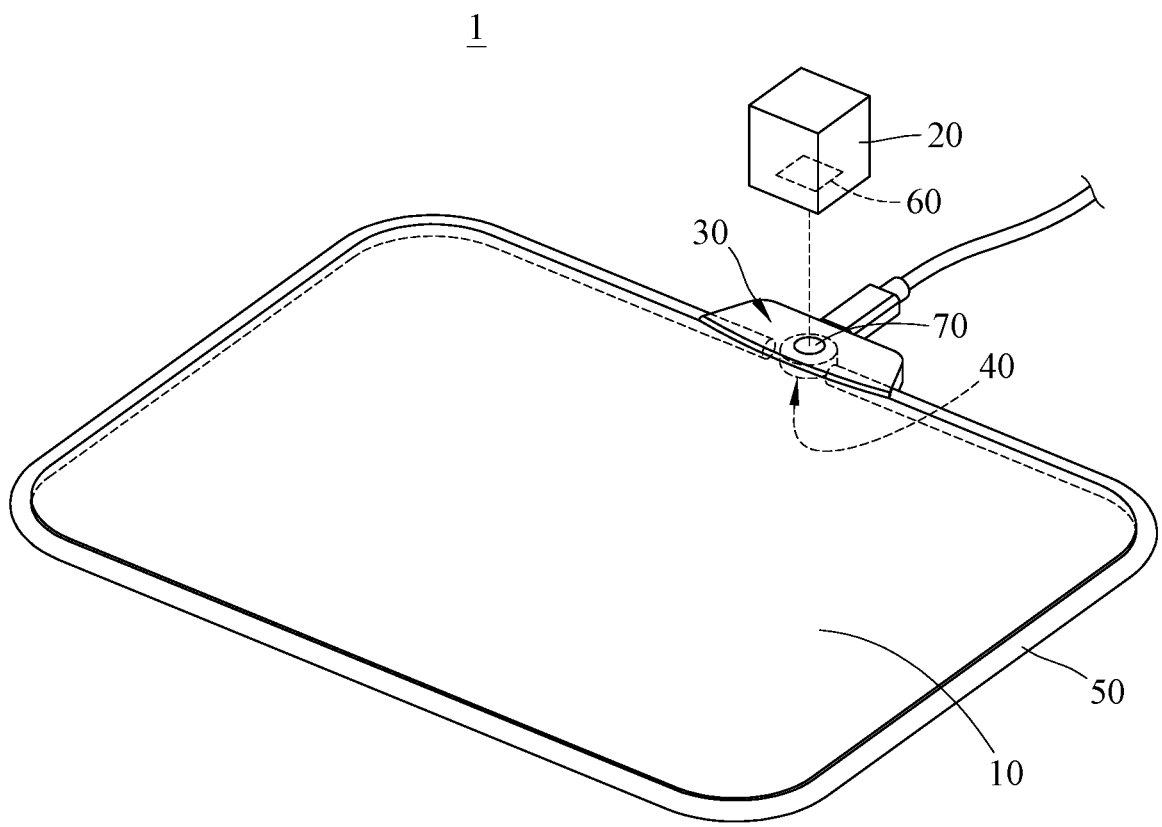
FIG. 3 depicts a mouse pad according to another embodiment of the disclosure.

It is also noted that the fixation portion 30 may not be integrally formed with the mat part 10. For example, please refer to FIG. 3, which shows another exemplary embodiment of the mouse pad 1. As shown, the fixation portion 30 may be attached to a side of the mat part 10 and served as a module suitable to be electrically connected between one or more electrical elements and an external power source. In specific, the mouse pad 1 may include a light source 40 and a light guide bar 50, the light source 40 is, for example, a light-emitting diode, and is suitable to be arranged within the fixation portion 30, and the light guide bar 50 may be integrally formed of a single piece made of light-permeable and flexible material, such as plastic or any typical material for light guide. In more detail, one or two ends of the light guide bar 50 may be aligned with or corresponding to the light source 40 so as to receive light emitted by the light source 40, the light guide bar 50 may be arranged along the edge of the mat part 10 so that the create luminous effect along the edge of the mat part 10. In such an arrangement, the mouse pad 1 can be served as a luminous mouse pad, and the fixation portion 30 can be employed as a light-emitting module to achieve the light-emitting function. The 3D decorative object 20 may be removably disposed on the fixation portion 30 by any one of the aforementioned manners.

Further, the fixation portion 30 may have a through hole or light-permeable area corresponding to the light source 40 and the 3D decorative object 20 disposed thereon so that the light emitted by the light source 40 can projected to the 3D decorative object 20. In some embodiments, at least part of the 3D decorative object 20 may be light-permeable so that the light emitted by the light source 40 can go into the 3D decorative object 20 and makes 3D decorative object 20 become luminous.

Figure 4:
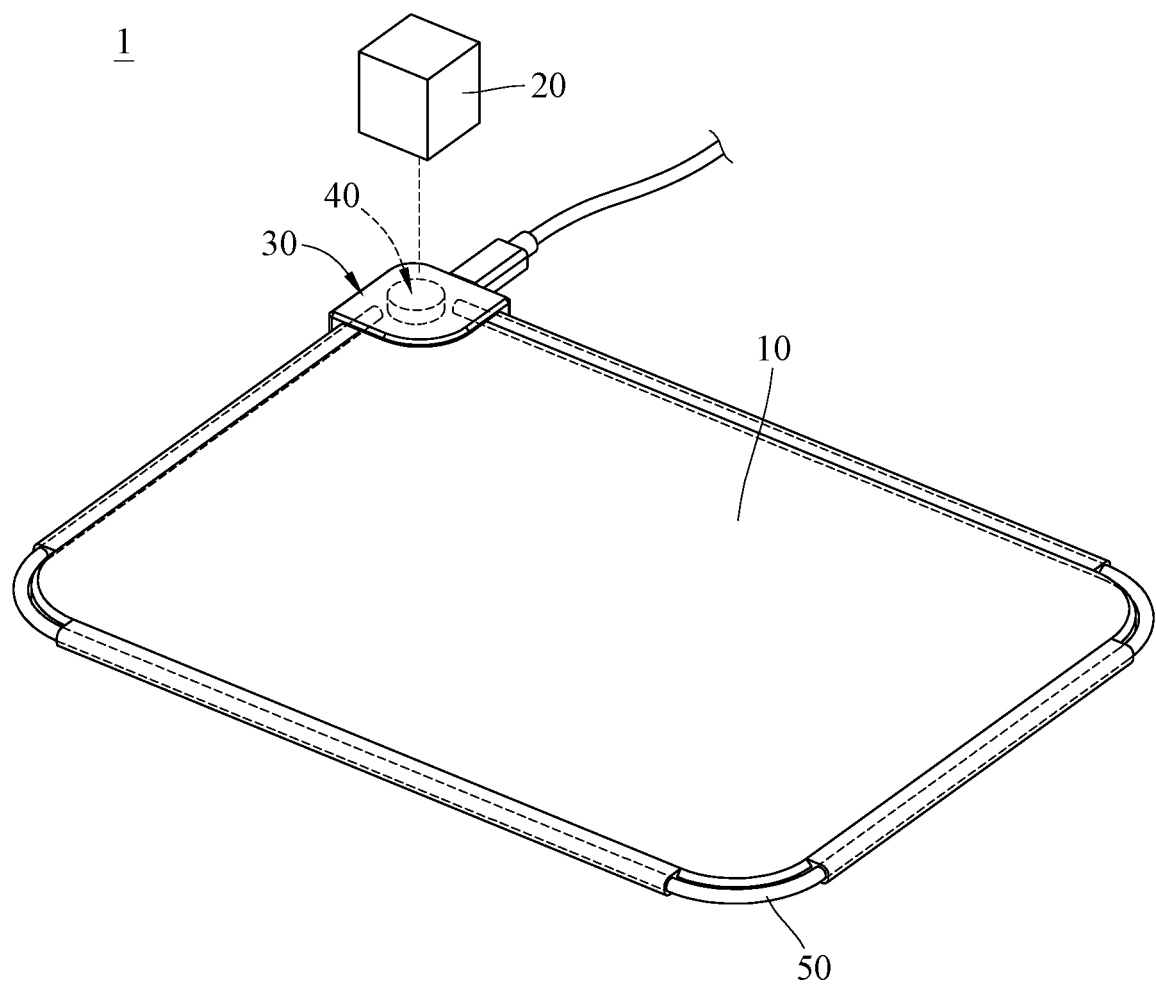
FIG. 4 depicts a mouse pad according to another embodiment of the disclosure.

Please refer to FIG. 4, which shows another exemplary embodiment of the mouse pad 1. As shown, the fixation portion 30 with a light source 40 therein may be arranged to any selected corner of the mat part 10. As such, when the 3D decorative object 20 is placed on the fixation portion 30, the light source 40 can make the edge of the mat part 10 luminous through the light guide bar 50 and make a corner of the mat part 10 have a standing our three-dimensionally luminous effect through the 3D decorative object 20.

Please refer back to FIG. 3, optionally, in some embodiments, the 3D decorative object 20 may have an internal electrical component 60. The internal electrical component 60 is, for example, a circuit board. When the 3D decorative object 20 is placed on the fixation portion 30 or is in direct contact with the fixation portion 30, the connection among the internal electrical component 60, an associated electrical component (e.g., a contact switch 70) in or on the fixation portion 30, and a cable connected to the fixation portion 30 may enable a signal communication connection between the 3D decorative object 20 and an external system (not shown) electrically connected to the mouse pad 1. The external system is, for example, a laptop computer, a desktop computer, a server, or any electronic device which is suitable to be electrically connected to the mouse pad 1. In one embodiment, the software (e.g., video game) running on the external system may respond to the placement of the 3D decorative object 20 onto the fixation portion 30, such as providing feedback via the interface in game. That is, the signal communication connection between the 3D decorative object 20 and the external system allows the player to have interactions with the video game through placing the 3D decorative object 20.

In some embodiments, optionally, the placement of the 3D decorative object 20 onto the fixation portion 30 to activate the contact switch 70 may also cause the light source 40 to activate, that is, when a player puts the 3D decorative object 20 on the fixation portion 30, the light source 40 and the interface in game may both respond to the player. In another embodiments, when the signal communication between the mouse pad 1 and the external system is built, the external system is also allowed to send signal back to the mouse pad 1 to, for example, change the luminous effect of the light source 40. This makes it possible to change the way the light source 40 illuminates the 3D decorative object 20. As such, while a player is playing video game on the external system, the external system may instruct the light source 40 how to illuminate the 3D decorative object 20 so as to respond to or interact with the player through the 3D decorative object 20.

In some embodiments, the 3D decorative object 20 may have an appearance of, game character or game items to enhance the gaming experience while the player interacts with the video game through the 3D decorative object 20.

Figure 5:
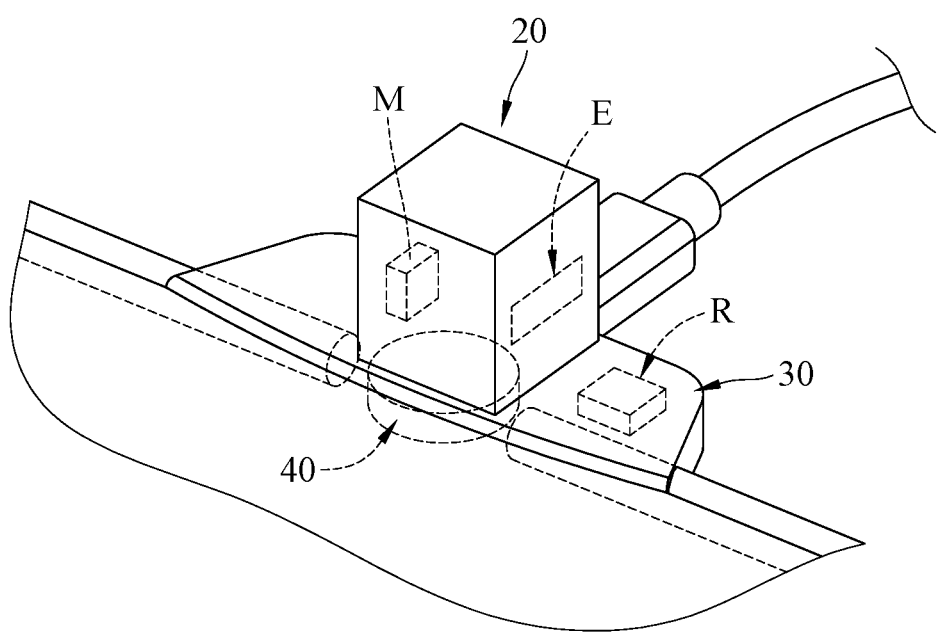
FIG. 5 is a partially enlarged view of a mouse pad according to another embodiment of the disclosure.

In some embodiments, the 3D decorative object 20 may have a means suitable for confirming information (e.g., identity, serial number) by an external device. For example, please see FIG. 5, the 3D decorative object 20 may have an electronic tag E therein or thereon, the electronic tag E may be a Radio-frequency identification (RFID) tag, correspondingly, the fixation portion 30 of the mouse pad 1 may have a sensing module R capable of recognizing or sensing the electronic tag E. When the 3D decorative object 20 is placed on the fixation portion 30 or falls within the sensing range of the sensing module R, the mouse pad 1 is able to identify the information about the 3D decorative object 20 and therefore change or adjust the luminous mode of the light source 40 accordingly, thereby changing the luminous effect of the mouse pad 1 and the 3D decorative object 20. Alternatively, as the mouse pad 1 identifies the 3D decorative object 20 via the electronic tag E and the sensing module R, the mouse pad 1 may send relevant signal to the external system to change or adjust relevant setting on the external system.

In some other embodiments, the electronic tag E may be a near field communication tag (NFC tag) that can be read by the sensing module R in the fixation portion 30 (i.e., the sensing module R may be a NFC reader). As such, when the 3D decorative object 20 is placed on the fixation portion 30 or falls within the sensing range of the sensing module R, the mouse pad 1 and/or the external system are able to obtain the information or data about the 3D decorative object 20.

Optionally, the 3D decorative object 20 may have a memory M therein for storing data, such as personal settings. As such, when the 3D decorative object 20 is identified by the mouse pad 1, the luminous mode of the light source 40 may be changed according to the personal settings stored in the 3D decorative object 20. Optionally, the 3D decorative object 20 is able to send the stored personal settings to the external system through the signal communication connection between the mouse pad 1 and the external system so as to change or adjust the settings on the external system accordingly. Optionally, the external system is allowed to send data generated by the software (e.g., video game) running thereon, such as game records, character's ability settings, or items, to the memory M in the 3D decorative object 20.

According to the mouse pads as discussed in the above embodiments of the disclosure, the mat part has a fixation portion for the placement of a 3D decorative object, which makes the mouse pad look more three-dimensional, decorative, and visually appealing and create various connection to peripheral devices. For example, the 3D decorative object may have an appearance of a logo stand, an electronic photo frame, a regular photo frame, or a game character or be able to emit light to enhance or build aesthetic elements for the mouse pad or enhance or create the connection with peripheral elements or the user.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A mouse pad, comprising:
a mat part having a fixation portion; wherein the 3D decorative object has an electronic tag therein, and the fixation portion has a sensing module therein configured for reading the electronic tag, and the electronic tag is a radio-frequency identification tag or a near field communication; and wherein a luminous mode of a light source of the fixation portion is determined according to the sensing module sensing the electronic tag in the 3D decorative object.

2. The mouse pad according to claim 1, further comprising a first magnetic material located at the 3D decorative object and a second magnetic material located at the fixation portion, wherein the first magnetic material and the second magnetic material are magnetically attracted to each other.

3. The mouse pad according to claim 2, wherein the second magnetic material is arranged at a surface of the fixation portion.

4. The mouse pad according to claim 2, wherein the second magnetic material is embedded within the fixation portion.

5. The mouse pad according to claim 2, wherein the second magnetic material is an electromagnet.

6. The mouse pad according to claim 1, further comprising a light source arranged within the fixation portion, wherein at least part of the 3D decorative object is light-permeable or is a through hole configured for guiding light generated by the light source.

7. The mouse pad according to claim 6, further comprising a light guide bar disposed on the mat part configured for guiding light generated by the light source.

8. The mouse pad according to claim 6, further comprising a contact switch disposed on the 3D decorative object or the fixation portion to activate the light source in response to a placement of the 3D decorative object on the fixation portion.

9. The mouse pad according to claim 1, wherein the 3D decorative object has an internal electrical component therein configured for communicating with an external system connected to the mouse pad via the fixation portion.

10. The mouse pad according to claim 9, wherein the 3D decorative object has a memory therein for storing data provided by the external system or to be provided to the external system.

11. The mouse pad according to claim 9, wherein a luminous mode of a light source of the fixation portion is determined according to the data stored in the memory of the 3D decorative object.

* * * * *